Patented Oct. 7, 1947

2,428,665

UNITED STATES PATENT OFFICE 2,428,665

COLORING OF CEREAL PARTICLES

Chastain G. Harrel and Robert O. Brown, Minneapolis, Minn., assignors to Pillsbury Mills, Inc., a corporation of Delaware No Drawing. Application August 10, 1944, Serial No. 548,932

2 Claims. (Cl. 99—83)

This invention relates to the imparting of color and flavor to cereal particles, such as ground wheat, semolina, corn or soya grits, coarse flours or middlings made from wheat, corn, soy beans and other natural cereal food crops, as well as whole grain cereals, such as pearl barley and the like.

It is an object of our invention to provide a simple, but highly efficient method for mixing edible colored pigments in cereal granules to the ends that the particles appear uniformly colored throughout and that the colors are fixed to such extent that they will not run or wash out when the particles are baked or otherwise cooked.

More specifically it is an object to provide a method whereby readily obtainable, edible pigments, such as the vegetable color ingredients prescribed for foods by the Food and Drug Administration of the United States, together with standard flavoring tinctures or concentrates may be successfully utilized to flavor and to permanently color appropriately, cereal particles which may be used to make various bakery products, ice cream, soup stocks, spaghetti and other foods.

In carrying out our method the cereal particles in dry state are placed in a mixer or agitator and a quantity of finely ground or otherwise very comminuted, dry, edible colors or pigments, preferably edible pigments of the type prescribed by the Food and Drug Administration of the United States, are added and intimately mixed with the dry cereal particles and during such agitation and mixing the ingredients are subjected to steam at a pressure preferably in a range of from 15 to 27 pounds per square inch. The agitation and mixing subjected to the steam is carried on until the particles are colored to the desired degree.

In this method the action of the steam materially increases the permeability of the particles to the minute grains of the pigment and the pressure of the steam also acts to some degree to drive the comminuted pigment into the pores and interstices of the cereal particles. The temperature produced by steam within the pressure range indicated, causes the pigments which are absorbed within the cereal particles to be heat-fixed to such extent that after treatment colored particles can be boiled or otherwise cooked without loss of color or perceptible running of the color from the particles. This is true even in cases where the water soluble vegetable pigments are used.

After the particles have been so colored, flavoring extracts appropriate to the color of the particles, usually in concentrate or alcohol tincture form, may be added and will impregnate the particles leaving the desired flavors in the pores and interstices.

It is, of course, desirable to utilize colors and flavors which are found together in natural spices and other highly flavored natural foods. Thus wintergreen and peppermint flavors are usually utilized with green coloring; cinnamon flavor is usually utilized with reddish, brown pigment; and natural orange flavor is used with orange color.

Our invention has been successfully carried out utilizing a number of different pigments among those prescribed by the Food and Drug Administration. Edible colored pigments have been highly successful as have also been vegetable and other pigments.

It is important in carrying out the process that the heating condition, effected of course by the ratio of temperature, steam pressure and time, be such that the starches at the most be not totally, but very slightly gelatinized and that the individual granules retain their individual characteristics after being processed.

The finished cereal particles prepared by our improved process appear uniformly colored throughout and the minute particles of the pigment are heat-fixed to such extent that the colors will not run or wash out when the particles are baked or otherwise cooked. The particles contain such amounts of concentrated flavoring that with the appropriate colors or pigments utilized they may be put to a large number of uses. For example, the prepared particles may be mixed with flour and other ingredients to bake cakes of different varieties having color and flavor associated therewith. In such instances, cereal particles of farina or semolina are preferred.

The color and flavoring may be imparted to various ice creams and pastry by mixture of prepared particles therewith and are particularly well adapted for use in making the popular "Rippel" ice cream of variegated colors.

Another excellent use for the prepared particles is in the manufacture of soup stocks, utilizing color and flavor, and in this connection in the preparation of pearl barley appropriating flavoring and coloring.

The preparation is, of course, capable of many other uses, such as in coloring and flavoring of spaghetti, pastry and other cooked foods utilizing flavor and cereal ingredients.

What we claim is:

1. The method of imparting colors to cereal particles which consists in mixing dry cereal particles with finely ground dry edible pigments and simultaneously subjecting the ingredients while being mixed to steam pressure for increasing the absorption of the pigment into said particles, forcing pigments into the particles under pressure and for heat-fixing the pigments within the interstices of the cereal particles.

2. The method of imparting colors to cereal particles which consists in intimately mixing a quantity of dry cereal particles with a quantity of finely ground, dry edible pigments and simultaneously subjecting said ingredients during the mixing to steam pressure within a range of from 15 to 27 pounds per square inch to increase the permeability of the particles to the pigment grindings, to force the pigments into the cereal particles under pressure and to further heat-fix the pigments within the pores of the particles.

CHASTAIN G. HARREL.
ROBERT O. BROWN.

REFERENCES CITED

The following references are of record in the file of this patent:

UNITED STATES PATENTS

| Number | Name | Date |
|---|---|---|
| Re. 15,474 | Block | Oct. 24, 1922 |
| 2,012,708 | Bostrom | Aug. 27, 1935 |
| 2,215,168 | Allred | Sept. 17, 1940 |
| 2,157,755 | Harrel et al. | May 9, 1939 |
| 2,348,443 | Barnett | May 9, 1944 |

FOREIGN PATENTS

| Number | Country | Date |
|---|---|---|
| 1,043 | Great Britain | 1887 |
| 269,796 | Great Britain | 1927 |
| 128,089 | Great Britain | 1919 |